June 10, 1930.  C. R. BOW  1,762,384
SEAT INDICATOR
Filed May 3, 1929
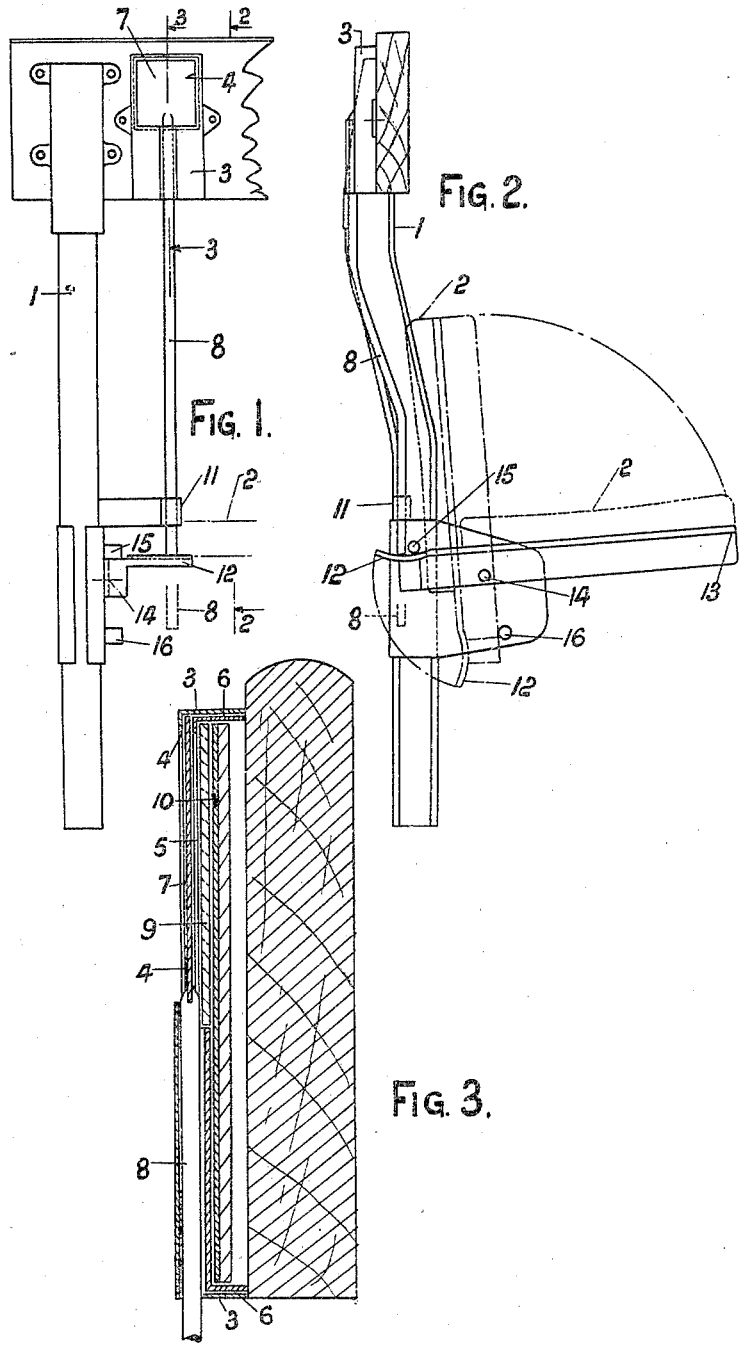

Patented June 10, 1930

1,762,384

UNITED STATES PATENT OFFICE

CHARLES ROBERT BOW, OF THORNLIEBANK, SCOTLAND

SEAT INDICATOR

Application filed May 3, 1929, Serial No. 360,059, and in Great Britain August 14, 1928.

This invention relates to luminous indicators for the seats of cinema theatres and the like of the kind which is designed to provide visual indication of the circumstance that a seat is vacant or occupied.

In the accompanying drawing Fig. 1 is a fragmentary rear elevation of a seat equipped with an indicator according to the invention, Fig. 2 a section on the line 2—2 of Fig. 1 and Fig. 3 a section drawn to a larger scale on the line 3—3 of Fig. 1.

Referring to the drawing, 1 denotes a seat back associated with a tip-up bottom 2. Carried by the seat back is a box 3 having an aperture 4 in register with an aperture 5 formed in a member 6 located within the box. Vertically slidable between the front wall of the box 3 and the member 6 is a shutter 7 carried on the upper end of a rod 8 guided between said front wall and the member 6. Disposed rearwardly of the shutter 7 is a glazed pane 9 behind which is located a luminescent sheet 10 which is visible through the pane 9 when the shutter 7 is in lowered position. The lower end of the rod 8 is guided through an eye 11 and bears on a lug 12 integral with a bottom supporting bar 13 pivoted at 14 to the seat back 1.

The arrangement is such that the shutter 7 participates in the tipping movements of the bottom 2 so that, when the bottom is in lowered position, the shutter is raised to mask the pane 9 whereby to conceal the sheet 10 from view and, when the bottom is in raised position, the shutter 7 is permitted to fall under gravity to unmask the sheet 10.

15, 16 denote stopper pins carried by the back 1 and serving to limit the angular movements of the bottom 2.

I claim:—

The combination with a seat having a seat back and a tip-up bottom, of a box mounted on the back and having a glazed aperture, a luminiscent sheet located within the box and normally visible through said aperture, a shutter mounted on said box and movable into a position clear of the aperture or into a position to close said aperture, and means operatively connecting said shutter with said bottom so that said shutter participates in the tipping movements of said bottom.

In testimony whereof I have signed my name to this specification.

CHARLES ROBERT BOW.